US012596362B2

(12) United States Patent (10) Patent No.: US 12,596,362 B2
Fiebiger et al. (45) Date of Patent: Apr. 7, 2026

(54) METHOD FOR DIAGNOSING AN OPEN-AND/OR CLOSED-LOOP CONTROL SYSTEM, AND OPEN- AND/OR CLOSED-LOOP CONTROL SYSTEM

(71) Applicant: Samson Aktiengesellschaft, Frankfurt am Main (DE)

(72) Inventors: Christian Fiebiger, Hofheim am Taunus (DE); David Wagner-Stürz, Muehltal (DE)

(73) Assignee: Samson Aktiengesellschaft, Frankfurt am Main (DE)

( * ) Notice: Subject to any disclaimer, the term of this patent is extended or adjusted under 35 U.S.C. 154(b) by 496 days.

(21) Appl. No.: 18/042,277

(22) PCT Filed: Aug. 13, 2021

(86) PCT No.: PCT/EP2021/072632
§ 371 (c)(1),
(2) Date: Feb. 20, 2023

(87) PCT Pub. No.: WO2022/038060
PCT Pub. Date: Feb. 24, 2022

(65) Prior Publication Data
US 2024/0028023 A1 Jan. 25, 2024

(30) Foreign Application Priority Data

Aug. 20, 2020 (DE) .......................... 102020121890.7

(51) Int. Cl.
*G05B 23/02* (2006.01)
(52) U.S. Cl.
CPC ................................. *G05B 23/0275* (2013.01)
(58) Field of Classification Search
CPC ............ G05B 23/0275; G05B 19/4184; G05B 2219/31211; G05B 2219/33284;
(Continued)

(56) References Cited

U.S. PATENT DOCUMENTS 5,970,430 A * 10/1999 Burns ................ G05B 19/0425
714/11
6,633,782 B1 * 10/2003 Schleiss ............. G05B 23/0229
700/86
(Continued)

FOREIGN PATENT DOCUMENTS

EP 1451649 A1 9/2004

OTHER PUBLICATIONS

Modest C et al, "SPYDER: a software package for system diagnosis engineering," CEAS Aeronautical Journal, Springer Vienna, Bd 7, Nr. 2, pp. 315-331; Mar. 28, 2016; ISSN: 1869-5582; XP035793769.
(Continued)

*Primary Examiner* — Manuel A Rivera Vargas
(74) *Attorney, Agent, or Firm* — Banner & Witcoff, Ltd.

(57) ABSTRACT

In a method for diagnosing control system of a process engineering plant having a plurality of actuating units for setting a process fluid and a central unit, at least one actuating-unit-specific control raw datum, such as a setpoint value, an actual value, a setpoint-actual difference value, or a control value, is detected; a particularly local diagnosis code is generated by one of the plurality of actuating units based on the at least one detected control raw datum; the diagnosis code is transmitted from the actuating unit to a central unit; a local diagnosis code, is transformed into a global diagnosis codes; a logical condition for a diagnosis deduction logic is defined such that when the logical condition is applied to at least one diagnosis code, the diagnosis deduction logic determines a predetermined deduction result; and a deduction result is determined based on the at least one diagnosis code.

21 Claims, 2 Drawing Sheets

(58) Field of Classification Search
CPC .......... G05B 19/4063; G05B 19/41875; G05B
19/418; Y02P 90/02
See application file for complete search history.

(56) References Cited

U.S. PATENT DOCUMENTS

| | | | |
|---|---|---|---|
| 7,085,610 | B2 | 8/2006 | Eryurek et al. |
| 9,104,650 | B2 * | 8/2015 | Hosek .................... B25J 9/1674 |
| 9,946,165 | B2 * | 4/2018 | Ypma .................. G03F 7/70633 |
| 2005/0096873 | A1 | 5/2005 | Klein |
| 2014/0201571 | A1 * | 7/2014 | Hosek .................... B25J 9/1674 |
| | | | 714/26 |
| 2019/0137357 | A1 * | 5/2019 | Maier .................. G05B 19/048 |

OTHER PUBLICATIONS

Nov. 26, 2021 PCT International Search Report and Written Opinion—
App. PCT/EP2021/072632 (with translation) .

* cited by examiner

METHOD FOR DIAGNOSING AN OPEN- AND/OR CLOSED-LOOP CONTROL SYSTEM, AND OPEN- AND/OR CLOSED-LOOP CONTROL SYSTEM

CROSS REFERENCE TO RELATED APPLICATIONS

This application is a U.S. National Stage Application of International Application No. PCT/EP2021/072632, filed Aug. 13, 2021, which claims priority to German Patent Application No. 10 2020 121 890.7, filed Aug. 20, 2020, each of which is incorporated herein by reference in its entirety.

BACKGROUND

Field

The disclosure relates to a control and/or regulation system for a process plant, such as a chemical plant, for example a petrochemical plant, a power plant, for example a nuclear power plant, a food processing plant, for example a brewery, or the like. Furthermore, the disclosure relates to methods for diagnosing a control and/or regulation system.

Related Art

Typical process control applications employ field devices with a control valve, so-called control devices, in order to influence a downstream process towards a specified steady-state or dynamic target via changes in the passing volume flows or mass flows. Process controllers implemented for process control do not control the mechanical position of the control valve directly. This mechanical position is implemented by means of control routines of subordinate control devices. In a thus formed controller cascade, the control difference formed as the difference between a process setpoint signal and an actual process value is fed to the process controller as an input signal in the master, figuratively outer, control loop. An output variable, which can be called the process control signal and which describes the target position of the control valve, is generated from the process control difference via a control method implemented in the process controller. This process control signal is fed to the control device. In addition, the control device captures a signal representing the actual position of the control valve. From these signals, the control electronics assembly of the control device determines a control signal for controlling an actuator, for example an actuating drive of a process fluid pump or control valve. The control routine of the control device is configured to compensate relevant local interference variables.

EP 1 451 649 B1 relates to the detection and discrimination of instabilities in a control device. A control device with a positioner, actuator and control valve installed in a process environment detects whether an undesired oscillation occurs due to a mechanical failure of the control system or due to a faulty configuration of a positioner. To this end, EP 1 451 649 B1 proposes capturing signals within the control device and establishing the presence and source of instabilities by means of an estimation unit. The estimation unit carries out statistical analyses in order to detect the presence of an instability. In order to identify the cause of the detected instability, the estimation unit uses phase angles of causally correlated signals to check whether there is a limit cycle in the control circuit of the control device. If appropriate, the temporal offset between the signal pressure and the valve position is determined in order to localize the fault cause in the control device. The diagnostic routines described in EP 1 451 649 B1 are typically aimed at fault causes localized within the control device.

Effects resulting from the interaction of a control device and its periphery, for example other control devices or a master process controller, can often only be taken into account in an incomplete manner. This makes it difficult to diagnose the causes of problems in situations in which a plurality of control loops of a controller cascade exhibit an undesired behavior. The diagnosis of a fault supposedly located in a particular control device can also be an artefact due to a malfunction of another control device or due to an operating behavior imposed on the control device by the process controller. Such artefacts can diminish the confidence of operating personnel in the diagnostic function of a particular device. Such artefacts can further lead to trouble-shooting efforts being steered towards an inexpedient approach. This can potentially result in a delay in the resolution of an issue or in a superfluous effort due to the erroneous replacement of a perfectly intact control device. Experienced operators are able to intuit in some cases, based on personal experience and while considering other circumstances, that an occurring artefact points to a silent cause of the problem in another part of the technical infrastructure. A problem or fault diagnosis that allows even inexperienced operators to identify an actual fault cause more reliably accordingly appears desirable.

U.S. Pat. No. 7,085,610 B2 relates to an industrial process diagnostic device for identifying a source or root cause of an anomaly in an industrial process. A diagnosis of the process control circuits in a process plant is determined based on a plurality of process signals in a process plant (including process variables, control signals and diagnostic signals) by means of a root-cause calculation device. The root-cause calculation device carries out an analysis to determine the root cause of an anomaly, for example, in a rule-based manner or by means of regressive learning, fuzzy logic or a neural network. The root-cause calculation device is designed to be implemented in any process device of a process plant, for example in a transmitter, a controller, a mobile communication device or a computer in a central control room. Often, however, a sufficient number of communication interfaces is not available for the transmission of a wide range of process signals. Even if all the necessary interfaces were available, many process signals cannot be provided at a desired time in practice, in particular not in real time, due to the limited bandwidth available in typical communication networks of process plants.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
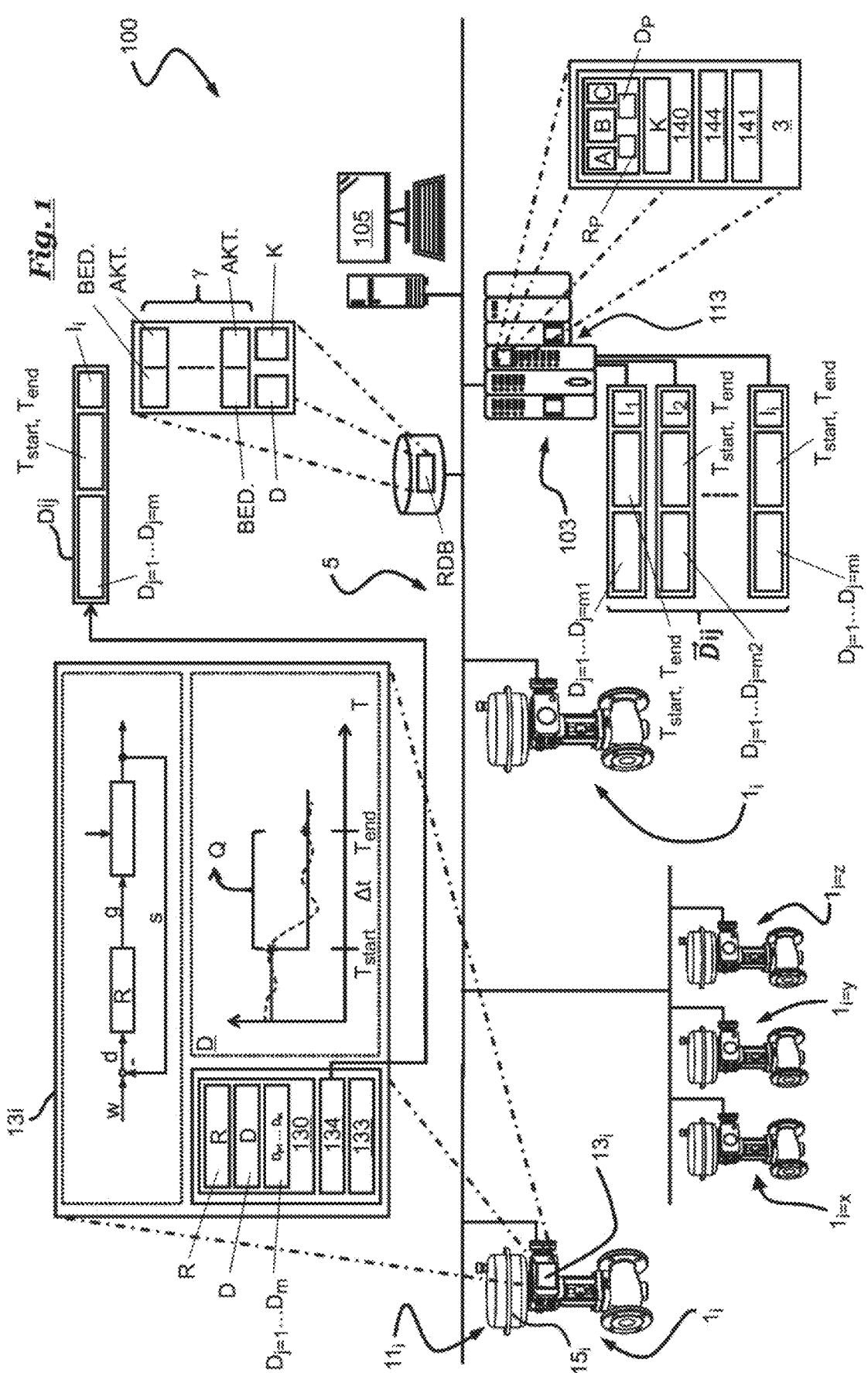
FIG. 1 shows a schematic illustration of a control and/or regulation system according to an exemplary embodiment of the present disclosure.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

An object of the disclosure is to overcome the problems of the prior art, in particular to provide a diagnostic method and/or a control and/or regulation system which, on the basis of a limited amount of available data, enables a reliable statement regarding fault causes in a process plant and/or a problem or fault diagnosis that allows a more reliable troubleshooting, in particular while considering empirical values.

A method for diagnosing a control and/or regulation system of a process plant, according to an exemplary embodiment, may include a plurality of control devices for adjusting a process fluid and a central unit is accordingly provided.

A process plant can be a chemical plant, for example a petrochemical plant, a power plant, for example a nuclear power plant, a food processing plant, for example a brewery, or the like. A process plant comprises a central unit and a plurality of active and/or passive field devices which are connected to the central unit, in particular unidirectionally or bidirectionally, in accordance with a signal transmission. An active field device can take the form of, for example, a control device for adjusting a process fluid of the process plant. Active field devices in the form of control devices are generally configured to intervene directly or indirectly in a process or sub-process of the process plant in order to influence a process state, for example in order to stabilize a process state or to bring about a change in the process. An example of a control device is a valve control device. A valve control device comprises a control valve or an on/off valve, wherein the control valve can be designed as a translationally movable stroke valve or as a rotationally movable pivot valve. With a control valve, a process fluid flow can be interrupted or adjusted to a desired setpoint value, for example a setpoint pressure, a setpoint temperature, a setpoint velocity, a setpoint volume flow or the like. The process plant can include passive field devices, for example in the form of sensors relating to a state variable or different state variables of the process plant or parts of the latter. The plurality of active field devices of the process plant comprises a plurality of control devices for adjusting a process fluid. A control device generally includes a computing unit, for example a positioner electronics assembly, a microcontroller or the like. The central unit also includes at least one computing unit, such as a processor. According to a variant, the computing units in the plurality of control devices or in the central unit can be designed to exchange data among one another. Whenever data of a specific computing unit of a specific control device are processed exclusively by this specific control device and/or the source of the data is not clearly identifiable for other computing units as said specific control device, the following refers to "local" data. Whenever it is determined in an evident manner for at least one other control device or the central unit in particular plant-wide, for example, by means of a special identifier, a unique signal transmission path or the like, to which specific control device a datum or the like relates, the following may refer to a "global" datum. The person skilled in the art understands that wherever a general reference is made to a value, a signal, a datum or the like without explicit characterizations of the latter as "global" or "local", the datum or the like described in that context is treated according to the appropriate device either as a local or as a global datum, etc.

The method for diagnosing a control and/or regulation system of a process plant, according to an exemplary embodiment, may include a plurality of control devices comprises the following steps: According to a step (a), it is provided that at least one control-device-specific raw control datum, such as a setpoint value, an actual value, a setpoint/actual value difference value or a control value is captured. A control device can be configured to receive a setpoint value, for example, from the central unit of a central control room of the process plant or from a master controller in a cascaded configuration. The control device can be configured to capture an actual value, for example relating to a process state, such as a state of a process medium, for example the process fluid, or a state of a part of the process plant or a component of the latter. An actual value can be established, for example, by a sensor and provided to the control device. The sensor can be part of the control device. An example of an actual value can be a position of a valve-actuating member, a temperature, a pressure, a noise level, a volume flow or the like, for example, of the process fluid. A setpoint/actual value difference value can be determined by means of a comparison or difference value formation based on a setpoint value and an actual value. A setpoint/actual value difference value can be, for example, a qualitative value, such as "too great" or "too small" or "within a permissible range", or a quantitative setpoint/actual value difference value, for example a numerical difference between a numerically specified setpoint value and a numerically specified actual value. The control device is configured to determine a control value that is transferred to an actuator of the control device in order to bring about a desired adjustment of a process fluid. For example, a control value can be determined based on a setpoint value according to a predetermined control routine. It is conceivable for a control value to be determined based on a setpoint/actual value difference value by means of a control routine. Alternatively, a control value can be determined directly based on a setpoint value and an actual value in accordance with some other control routine. The raw control datum is generally control-device-specific inasmuch as it relates to a section of the process plant or of the process that interacts with the specific control device. In particular, such raw control data are control-device-specific with regard to a particular control device and are processed using a computing device of the particular control device. A control-device-specific raw control datum of a particular control device is preferably sent by the particular control device and/or received by the particular control device and/or generated by the particular control device.

The method for diagnosing a control and/or regulation system, according to an exemplary embodiment, may further include a step (b) according to which at least one preferably local diagnostic code relating in particular to an anomaly is generated by one of the plurality of control devices on the basis of the at least one captured raw control datum. The local diagnostic code relates to the particular control device among the plurality of control devices that generates the local diagnostic code. Step (b) is preferably carried out following step (a). It is evident that a plurality of raw control data can be generated according to step (a) before a local diagnostic code is generated according to step (b). The generation of a local diagnostic code can be based on one or more raw control data generated beforehand by the control device. A diagnostic code can contain a qualitative or quantitative diagnostic statement regarding the particular control device. In a particularly simple case, the local diagnostic code can correspond to a simple binary diagnostic statement such as "fault-free" or "faulty". The local diagnostic code can relate to the entire control device, the entire function of the control device, a part of the control device or a subfunction of the control device. A diagnostic code can comprise a quantitative diagnostic statement that characterizes, for example, the behavior of a control device designed as a control valve in a partial stroke test (PST) or a full stroke test (FST). A diagnostic code can characterize the response behavior of the control device, in particular a regulation routine or a control routine of the control device, for example with regard to whether an oscillating, for example overshooting, behavior can be detected during the use of the control device; with regard to the reaction time between the specification of a particular setpoint value or setpoint value curve and an intended actual value or actual value curve; for example a step response or the like. A number of different diagnostic methods and/or diagnostic statements relating to control devices are known to the person skilled in the art. A diagnostic code can relate to a particularly critical malfunction of the control device, for example a stoppage, such as a breakage of the actuating rod and/or shaft. A diagnostic code can relate to a process variable that is outside a permissible range, for example a pneumatic supply pressure, a supply voltage, a temperature, vibration or the like. The diagnostic code preferably contains an anomaly-specific diagnostic statement that identifies the anomaly.

The method for diagnosing a control and/or regulation system may further include a step (c), wherein the at least one diagnostic code is transmitted by the particular control device in question to the central unit. In the method, the step (c) of transmitting is carried out following a step (b) of generating the diagnostic code by one of the plurality of control devices. It can be preferable for the transmission according to step (c) to take place immediately, i.e. shortly after completion of a generation step (b), for example within less than an hour, in particular less than 30 minutes, preferably less than 10 minutes, particularly preferably less than 1 minute, even more preferably less than 30 seconds and especially preferably less than 5 seconds. It is evident that a plurality of diagnostic codes can be generated in a process plant before at least one particular diagnostic code is transmitted by a respective control device to the central unit. Alternatively, every diagnostic code generated by the control devices of the process plant can be transmitted by the respective control devices to the central unit. It is conceivable for a first group consisting of one or more critical control devices to be configured to transmit every diagnostic code generated by the group of control devices from the respective critical control device to the central unit. Alternatively or additionally, it is conceivable for a second group consisting of at least one or more other control devices to be configured to transmit the respective diagnostic code of the other control device to the central unit only in the presence of a particular further transmission criterion, for example in response to a request preferably addressed to the control device by the central unit, in response to the presence of a predetermined diagnostic code, in the presence of a combination of predetermined diagnostic codes, at predetermined time intervals or at predetermined times, or in the presence of a combination of the aforementioned transmission criteria. The respective control device can be configured to transmit a local or a global diagnostic code to the central unit.

The method for diagnosing a control and/or regulation system may also include a step (d), wherein a local diagnostic code originating from and/or relating to a particular control device is transformed into a global diagnostic code by linking the local diagnostic code with a control-device-specific identifier. It is conceivable for the central unit to be configured to link a transmitted local diagnostic code with a control-device-specific identifier, for example when the central unit is able to unequivocally assign a received diagnostic code to a particular control device based on an in particular temporal and/or syntactic matching. The provision of an identifier and linking of a unique identifier with local diagnostic codes in order to upgrade a local diagnostic code to a global diagnostic code is particularly expedient in process plants in which the central unit is connected to a plurality of identical or similar control devices which can be, for example, identical in design, type or the like and/or whose respective local diagnostic codes are formatted in a similar or identical manner.

The method for diagnosing a control and/or regulation system may also include according to step (e) defining at least one logical condition for a diagnosis deduction logic so that a predetermined diagnosis result is determined with the diagnosis deduction logic when the at least one logical condition is applied to the at least one diagnosis code, preferably to a plurality of diagnosis codes. In a simple case, a deduction logic can be defined according to an if-then logic, wherein, based on the presence of a particular diagnostic code, in particular a particular global diagnostic code, the deduction logic deems an if-condition fulfilled and determines a then-deduction result associated with the latter.

Logical conditions for the diagnosis deduction logic can be defined according to a binary logic, a so-called fuzzy logic, or the like. A diagnosis deduction logic can be defined, for example, based on two-match rules, three-match rules, multiple-match rules, non-match rules, group (wildcard) rules, etc. according to one or more logical conditions. For example, a two-match rule can match a particular deduction result with the presence of two particular diagnosis codes. Three-match or other multiple-match rules work analogously. A non-match rule can define as logical conditions that a predetermined deduction result is matched with the non-presence of a combination of different particular diagnosis codes. A group (wildcard) rule can define, for example, logical conditions in such a manner that, if a predetermined minimum number of a predetermined set of particular diagnostic codes is present, for example at least two particular diagnostic codes of a predetermined set consisting of three particular diagnostic codes, a matched particular deduction result is determined. The diagnosis deduction logic preferably provides a persistent replication of expert knowledge. Defining a diagnosis deduction logic comprises the provision of machine-coded rule descriptions, in particular based on expert knowledge, for describing the behavior of one or more components of a process plant in particular in interaction with one another.

According to the method for diagnosing a control and/or regulation system, after the definition of the one or more logical condition(s) for the diagnosis deduction logic in step (e), at least one deduction result is determined in step (f) by means of the deduction logic based on the specified definition and based on the at least one diagnostic code in the central unit. The central unit is configured to implement the diagnosis deduction logic. By means of the diagnosis deduction logic, at least one deduction result is determined by the central unit based on the local or preferably global diagnostic codes available to the central unit. The central unit applies the one or more logical conditions of the diagnosis deduction logic to at least one, preferably more than one, diagnostic code relating in particular to anomalies in order to determine one or more deduction results.

According to an embodiment, the step (f) comprises the determination of at least one deduction result that considers the determination of at least one first global diagnostic code of a first control device and at least one second global diagnostic code of a second control device. It is in particular possible in step (f) to consider a plurality of different global diagnostic codes of a plurality of different control devices.

According to another embodiment that is combinable with the previous embodiment, the step (f) of determining at least one deduction result can comprise that the central unit considers a set of global diagnostic codes in order to form a deduction result from a modified quantity of the diagnostic codes considered. The modified quantity of diagnostic codes corresponds to the set of global diagnostic codes minus at least one of the global diagnostic codes of the set and/or plus at least one central diagnostic code. A modified quantity of diagnostic codes can be formed from a given set of global diagnostic codes by means of a deletion of a global diagnostic code and/or an addition of a central diagnostic code by the central unit and/or a replacement of a global diagnostic code with a central diagnostic code. The deduction logic can be equipped, for example, with a logical condition which detects in a predetermined constellation of particular global diagnosis codes that a diagnosis result is false positive and which deletes the global diagnosis codes identified as false positive. Alternatively or additionally, the deduction logic could be configured to detect in a predetermined constellation of global diagnostic codes in a set of global diagnostic codes that there is a further fault that is not manifested in the global diagnostic codes and to generate a new central diagnostic code in relation to the further fault.

According to a further embodiment, the generating step (b) comprises that the at least one local or global diagnostic code relates to an anomaly based on the at least one raw control datum. Step (b) further comprises an anomaly description step in which at least one piece of information relating to the anomaly is determined based on raw control data. The step (b) of generating the at least one diagnostic code comprises imprinting on the diagnostic code a piece of information, in particular a diagnostic statement, regarding the type of the anomaly, the cause of the anomaly and/or a diagnostic and corrective measure in view of the anomaly. The central unit can potentially use the diagnostic statement as an identifier of the diagnostic code for an unequivocal attribution to a particular control device.

According to an embodiment, the method further comprises a quality determination step in which at least one quality index is calculated based on raw control data, wherein the step (b) of generating the at least one diagnostic code comprises imprinting a quality index on the diagnostic code. A quality index can relate to, for example, a statistical control deviation, a reaction time, a number of overshoots, an amplitude of a maximum overshoot, an integral value relating to the absolute value of the control deviation, a statistical moment, in particular nth statistical moment of the control deviation and/or fuzzy set matches. A quality score can relate to a local time or a global time. The generation of the in particular local diagnostic codes can comprise the calculation of at least one quality score or a plurality of quality scores from the raw control data, in particular following the capture of the raw control data. The diagnosis deduction logic can be configured to consider a quality index. The application of a diagnostic routine for generating a diagnostic code can comprise loading data for the description of analysis rules from an in particular local memory of a control device, preferably of a valve positioner, and the processing of a quality index according to the loaded analysis rules.

According to an embodiment of the method, the global diagnostic code is formed by the control device in the course of generating or sending the local diagnostic code. Alternatively, the global diagnostic code can be formed in the method described in the foregoing by a communication device in the course of the transmission of the local diagnostic code in particular from the control device preferably to the central unit. Alternatively, the global diagnostic code is formed by the central unit in the course of the reception of a local diagnostic code or the determination of the at least one deduction result. It is conceivable for a control device to be configured to immediately link the diagnostic code with a control-device-specific identifier during the step (b) of generating a diagnostic code so that the diagnostic code is already provided in the form of a global diagnostic code during the step (c) of transmitting the diagnostic code from the particular control device to the central unit and can thus be unequivocally attributed by the central unit to the control device on whose control-device-specific raw control data the diagnostic code is based. Alternatively or additionally, the transformation of the local diagnostic code relating to or originating from a particular control device can occur during step (c) in the course of the transmission of the diagnostic code to the central unit, for example through the transmission of the diagnostic code by the control device to the receiving central unit via a dedicated signal transmission line so that an identifier that allows an unequivocal attribution of a diagnostic code to a particular control device by the central unit is provided to the central unit through the signal input. It is conceivable for the transformation of a local diagnostic code according to step (d) to occur between the generation of the local diagnostic code according to step (b) and its transmission according to step (c), for example by linking a generated diagnostic code with an identifier prior to the transmission of the diagnostic code by means of a control device electronics assembly.

According to an embodiment of a method according to the disclosure, the step (b) of generating the at least one diagnostic code comprises considering for the generation of the diagnostic code a temporal relation, such as a simultaneity, sequence or time series, of at least two raw control data. A sequence can in particular relate to at least three, at least five, at least seven or more successive raw control data. It is evident that a temporal relation can relate to a global time considered, for example, by the central unit, or to a local time of a particular control device.

According to an embodiment, the in particular at least one local diagnostic code generated by a particular control device, in particular during the step (b) of generating the diagnostic code, can be correlated with a control-device-specific local time. A local time can be defined, for example, by a timer of the control device. A local time can be defined as a local point in time, for example by means of a control-device-specific time stamp, as a local time period, for example from a local start time to a local end time, as a local time window after a control-device-specific event and/or as a local periodic time interval. The central unit can be configured to apply at least one temporal condition, for example, relating to a simultaneity, a sequence or a succession of diagnostic codes to the respective particular control device in relation to a local time. For example, the central deduction logic can be configured to diagnose diagnostic codes of the same control device over time, for example over the course of a month or a year, while considering indicated local times in order to capture a change in the behavior of the control device during its lifetime.

According to an embodiment of the method, at least one diagnostic code is correlated with a global, in particular absolute time. A global time can relate to a global time stamp, a global time period from a global start time to a global end time, a global time window after a particular event or to a particular periodic time interval. The correlation of a diagnosis code with a global time can occur in the course of the generation (b) of the diagnostic code, in the course of the transmission (c) of the diagnostic code or in the course of the determination (d) of the deduction result. In a method in which diagnostic codes are correlated with a global time, it can be preferable for all diagnostic codes considered by the deduction logic or at least a part of the diagnostic codes considered by the deduction logic to be correlated with a respective global time. The diagnosis of the deduction logic can in particular be designed to apply at least one or more logical rules with temporal criteria (for example relating to a simultaneity, a succession or the like) exclusively to in particular global diagnostic codes that are correlated with a global time. This makes it possible to detect at an early stage, for example, a cascading failure announced by the occurrence of particular plant component faults in a particular sequence.

According to an embodiment, the step (f) of determining at least one deduction result comprises assigning and applying the diagnosis deduction logic to a set of global diagnostic codes, wherein the diagnosis deduction logic considers at least one temporal condition, for example a temporal simultaneity, sequence or time series, of at least two predetermined global diagnostic codes in relation to the global time. The deduction logic can be configured to apply temporal conditions in relation to global diagnostic codes of the same control device. Alternatively or additionally, the deduction logic can be configured to apply at least one temporal condition in relation to at least two global diagnostic codes of different control devices.

According to a variant of the method, the local time can be defined as a local time window with an opening time that is determined depending on a predetermined process signal result or raw control datum, for example a predetermined signal sequence of a setpoint value, such as a step response, a sinusoidal response or a ramp response, or for example a predetermined signal sequence of an actual value signal, such as a load step. The local time window can also be defined with an opening duration.

According to a further variant that can be combined with the previous variant, a local time can be defined as an in particular periodically recurring local time interval, such as a discrete control cycle of a digital control device, wherein a constant control variable is provided by a control and/or regulation electronics assembly of the control device to an actuator of the control device in particular during the discrete control cycle. In particular, the control variable is calculated by means of a setpoint value, an actual value, a control deviation defined by the difference between the actual value and the setpoint value, and a control routine that considers the control deviation, such as a PID control routine.

According to an embodiment of a method, a computing unit of an individual particular control device is used both for the generation (b) of at least one in particular local diagnostic code as well as for the determination (f) of a deduction result while considering at least one other diagnostic code of at least one other control device. In other words, a control device of the process plant can be implemented in functional union both as a control device and as a central unit.

The disclosure also relates to a control and/or regulation system for a process plant comprising a plurality of control devices, a central unit and a communication unit for transmitting at least one diagnostic code from the plurality of control devices to the central unit. Each control device respectively comprises a control valve for adjusting a process fluid flow and a computing unit which is configured to actuate the control valve based at least one raw control datum according to a control and/or regulation routine. The computing unit is further configured to generate at least one in particular local diagnostic code preferably regarding an anomaly based on at least one raw control datum according to a diagnostic routine. The central unit is configured to obtain at least one logical condition to be applied to at least one diagnostic code as a diagnosis deduction logic and to determine a diagnostic deduction result according to the diagnosis deduction logic based on the diagnostic codes provided by the plurality of control devices.

According to a variant of a control and/or regulation system, the central unit is integrated in one of the control devices, in particular in a control-device-specific computing unit. According to another embodiment of a control and/or regulation system, the central unit is implemented separately from the control devices in a computer, such as a process control computer, a remote server, a workstation computer, a tablet computer or the like. The central unit can be configured in such a manner that the diagnosis deduction logic is only applied after a predetermined minimum number of in particular local diagnosis codes are available to the central unit. For example, a minimum threshold can be defined as the product of the number of control devices communicating with the central unit by a predetermined factor, such as 5, 10, 50, 100 or 1000, relating to the number of diagnostic codes of the control device. A minimum threshold value can alternatively or additionally be defined based on a minimum time period, such as an hour, a day, a week or a month, within which the diagnostic codes of the control units of the process plant were continuously transmitted to the central unit.

According to another embodiment of a control and/or regulation system that can be combined with the previous embodiments, the control and/or regulation system is configured to carry out the method described in the foregoing.

The disclosure generally relates to the performance of a control circuit analysis based on diagnostic codes of different control devices that are generated in the individual control devices based on raw control data of the respective control devices. For diagnostic purposes, the control circuit analysis is intended to apply a deduction logic to the diagnostic codes in order to infer a diagnosis deduction result. The control circuit analysis is not based on the actual raw control data but on diagnostic codes. In many cases, the raw control data are either simply not available or the technical effort to capture the raw control data is not viable for economic reasons or for technical reasons, for example because the bandwidth required for transmitting the raw control data is not available in the process plant or because the available bandwidth is absolutely necessary for the operational control and/or regulation of the components of the process plant. The diagnosis deduction logic replicates expert knowledge regarding a process plant. The expert user persistently replicates his knowledge of interrelationships between diagnostic codes of the control devices, in particular valve positioners, in the form of one or more logical conditions and actions deduced from the latter, which form the diagnosis deduction logic. By means of the diagnosis deduction logic, a consolidated diagnostic statement as to an overall measure that is suitable at a hierarchy level of the process plant, for example for fault correction or prevention, can be deduced on the basis of a collection of in particular global diagnostic codes received and saved in a central unit. The application of a diagnosis deduction logic to one or more diagnostic codes thus provides a kind of meta-diagnosis in order to assist the user of a central unit, for example supervising personnel in a control room, in the estimation of a plant state.

FIG. 1 shows a schematic illustration of a process plant 100 by way of example. The illustration of the process plant is reduced to selected components for monitoring and influencing the plant process. It is evident to the person skilled in the art that the process plant comprises numerous other components for carrying out the plant process that are not illustrated here such as, for example, safety equipment, containers, heating systems, reactors and piping.

The process plant 100 comprises a plurality of control devices $1i$, $1x$, $1y$, $1z$ and a central unit 3 connected to the latter. The control devices 1 illustrated in FIG. 1 are illustrated as control devices with an identical design purely by way of example. The index i marking the control devices 1 and their components 13, 15 is to be understood as a placeholder for a control-device-specific identifier. The indices x, y and z designate different control devices 1.

A control device $1i$ is preferably configured as a control valve $11i$ for adjusting a process fluid flow. A computing unit $13i$ or control and/or regulation electronics assembly is configured to actuate the control valve $11i$ based on raw control data according to a control and/or regulation routine. To this end, the computing unit $13i$ can provide, for example, a pneumatic control signal g to a, for example, pneumatic actuator $15i$, which produces an actuating movement and/or actuating force of the control valve $11i$. The computing unit $13i$ can include one or more sensors, which are not illustrated in detail and which capture the actual values s, such as an actual value position of the control valve $11i$.

The control device $1i$ can be connected to a central control room 103, which provides the control device $1i$ with a command signal w via the communication network 5. The computing unit $13i$ can be designed to generate the control signal g based on the command signal w and an actual value signal s. In this example, the actual value signal s, the command signal w or setpoint signal and the control signal g constitute raw control data of the control valve $11i$. It is conceivable for a computing device (not illustrated in detail) upstream of the control device $1i$ to receive the setpoint variable or the command signal w from the control room 103 and an actual value s from a sensor in order to form a setpoint/actual value difference d, which can be relayed to the computing unit $13i$. The computing unit $13i$ can be designed to carry out a control routine R based on a received setpoint/actual value difference d in order to determine the control signal. A setpoint/actual value difference d can also be considered a raw control datum of the control device $1i$. The signal processed by the computing unit $13i$—i.e., for example, an actual value signal s, a setpoint signal w, a setpoint/actual value difference d and a control signal g—are raw control data that relate specifically to the control device $1i$.

The computing unit $13i$ is further designed to carry out one or more diagnostic routines R in order to generate diagnostic codes $D_j$, $D_{ij}$ based on the raw control data. The diagnostic codes relate to the control device $1i$ and can characterize, for example, either a correct or a faulty behavior of the control device $1i$. A control-device-specific diagnostic code $D_j$, $D_{ij}$ relating to the control valve $1i$ can describe the behavior of the entire control device $1i$ or only a part of the components and/or functions of the control device $1i$.

The computing unit $13i$ can comprise, for example, a processor 133 and a memory 130 as well as a network interface 134. The computing device $13i$ can be provided, for example, in the form of a microcontroller. The computing unit $13i$ of the control device $1i$ is configured to execute different functions, for example a control routine R and at least one diagnostic routine(s) D. Both the control routine R and the diagnostic routines D are carried out by the computing unit $13i$ based on the raw control data w, s, d and g.

The diagnostic routine D can consider a signal sequence of a raw control datum in relation to a time, as illustrated by way of example in FIG. 1, in order to determine, for example, a quality index Q. The quality index Q can characterize, for example, the quality of the control routine R. In the present example, the diagnostic routine D can, for example, relate to the step response of a control signal g to a step-shaped, varying setpoint signal w over the course of the global time T between a global start time $T_{start}$ and a global end time $T_{end}$.

In an example embodiment, the valve control device $11i$ can include an electrically controllable supply and/or evacuation of a medium, in particular of a pneumatic fluid, to and/or from the in particular pneumatic actuator $15i$. To this end, the positioner electronics assembly $13i$ can comprise an electropneumatic transducer and/or a pneumatic relay. According to an alternative embodiment, the actuator $15i$ can be provided in the form of an electric actuator such as an electric actuating drive. According to another alternative embodiment, the actuator $15i$ can be provided in the form of a hydraulic actuator such as a hydraulic actuating drive.

The control room 103 of the process plant 100 also includes a central computing unit 113. The central computing unit 113 comprises a memory 140 and a processor 141. The processor 141 and memory 140 of the central computing unit 113 can be configured to implement higher-level process control functions $R_p$ and/or control circuit diagnostic functions $D_p$ relative to the numerous control devices $1i$, $1x$, $1y$, $1z$. The central computing unit 113 can generate one or more command variables w through application of a process control routine $R_p$. The command variables w are provided to the individual control devices $1i$ by the control room 103 via the communication network 5.

The control devices $1i$ can transmit their local or global diagnostic codes $D_j$, $D_{ij}$ to the control room 103, which can be saved in a central memory 140 of the control room 103 as a set $\vec{D}_{ij}$ of diagnostic codes. In the set of diagnostic codes $\vec{D}_{ij}$ stored in the memory 140 of the control room 103 according to FIG. 1, a control-device-specific identifier $I_i$ is assigned to each diagnostic code $D_{ij}$, which thus constitute global diagnostic codes $D_{ij}$. The global diagnostic codes $D_{ij}$ are respectively matched with indicated global times T, wherein in the example illustrated in FIG. 1 a global start time $T_{start}$ and a global end time $T_{end}$ are attributed to each global diagnostic code $D_{ij}$ in the memory 140 of the control room 103.

The global diagnostic codes $D_{ij}$ saved in the form of a set $D_{ij}$ by the control room 103 are generated by the control devices $1i$ in the examples illustrated in FIG. 1 and, in the course of the generation by the respective control device $1i$, are linked with a control-device-specific identifier $I_i$ and attributed a global time $T_{start}$, $T_{end}$. The diagnostic codes $D_{ij}$ generated in this manner are relayed by the control device $1i$ to the communication network 5 for transmission to the control room 103 via a network interface 134 of the computing unit 13*i*.

The process plant 100 includes a central unit 3 with a control database RDB in which a diagnosis deduction logic $\gamma$ manifests itself. The diagnosis deduction logic $\gamma$ can be defined as a set of logical rules or conditions BED, wherein each of the logical rules is assigned a predetermined action AKT. By applying the diagnosis deduction logic $\gamma$ to the set $\vec{D}_{ij}$ comprising numerous diagnostic codes D, the conditions BED of the diagnosis deduction logic $\gamma$ are applied to the diagnostic codes D. If one or more of the conditions BED is met by the set $\vec{D}_{ij}$ of the diagnostic codes D, the action AKT respectively assigned to a particular condition BED is implemented in order to determine a diagnosis deduction result K.

In the example shown in FIG. 1, the central unit 3 is formed as a separate unit relative to the control devices $1i$. It is evident that a central unit 3 can also be provided as part of a particular control device among the plurality of control devices, for example the control device $1_z$ designated by the index z, which can be called a central control device. Alternatively, the central unit 3 can be provided as part of the computing unit 113 of the control room 103. It is conceivable for a central unit 3 to be constituted, for example, by a workstation computer 105.

An expert and other users of the process plant can interact with the process plant 100 by means of one or more workstations 105. For the purposes of a simplified illustration, the workstation computer 105 in the preceding example according to FIG. 1 is connected to the same communication network 5 as the other illustrated parts of the process plant 100. It is evident that the process plant can comprise different networks that are separate from one another, hierarchically structured networks, or can have a different network topology than the one illustrated. For example, the control room 103 can be connected to the workstation computer 105 via a first network and to the control devices $1i$ via a second network. FIG. 1 illustrates the communication network 5, which connects the control devices $1i$ and the control room 103 according to a bus topology. It is evident that the communication network 5 can be partially or fully implemented according to some other topology, for example in the form of a ring, line, mesh, star or tree. The communication between the control devices $1i$ and the control room 103 can be provided as a direct single-hop communication from each individual control device to the control room or as a multi-hop communication, wherein one or more control devices are provided as a communication link between the control room 103 and the particular control device. It is evident that it is also possible to implement mixed forms of topology and/or signal transmission. The available bandwidth for transmitting data from the control devices to a central unit 3 is limited in particular in process plants that operate at least partly with a multi-hop signal transmission, which can make the diagnostic method according to the disclosure expedient.

The diagnosis deduction logic $\gamma$ can be defined by an expert user, for example, by means of the workstation computer 105. The definition of the diagnosis deduction logic $\gamma$ can be implemented by defining a logical condition that determines an assignment of one or more diagnostic codes $D_{ij}$ to a deduction result K. The diagnosis deduction logic $\gamma$ can comprise a plurality of different logical conditions BED. Each logical condition BED can be assigned to an action AKT, which indicates the deduction result K of the respective condition BED. The sum of the actions AKT determines the total deduction result K.

The number of control devices $1i$, in particular valve control devices $11i$, and process controllers 103 as well as the topological design of the network 5 are given by way of example and are not to be understood as a limitation of the method according to the disclosure for diagnosing the plant 100. The process computer 103 can be provided, for example, as a DCS or PLC.

The central unit 3 and the control facility (controller) 103 can be configured to exchange data between the diagnosis deduction routine and the control program. A data exchange between the central unit and the central computing device 113 can be provided in particular when the control room 103 and the central unit 3 are provided in functional union. For example, the diagnosis deduction routine can be designed to adopt and/or save process data of the control program $R_P$, in particular to correlate said process data with diagnostic codes, for example temporally, and to base the determination of a diagnosis deduction result K on this.

The logical conditions BED and the actions AKT assigned to the same can be saved as machine-coded rule descriptions in the rule database RDB of the central unit 3. In embodiments, the machine coding can be implemented by externally structured and in particular fixed format data sets or by explicitly structured data sets such as, for example, XML.

The diagnosis deduction logic $\gamma$ can be defined, for example, on the basis of conditions that link the behavior of a plurality of diagnostic codes by means of a logical connective, such as an "AND" connective, a logical "OR" connective, a logical "EXCLUSIVE OR" connective. Logical conditions BED of the diagnosis deduction logic $\gamma$ can comprise logical operators such as "NOT" or "EXCLUSIVELY" in relation to at least one diagnostic code $D_{ij}$. Logical conditions BED of the diagnosis deduction logic $\gamma$ can comprise connectives, groupings, parentheses and other semantic structuring elements.

The memory 140 of the control room 103 or some other central unit 3 can contain a control program $R_P$ that is executed continuously in order to monitor and/or influence the plant process or a part of the latter. The control room 103 can provide command variables w for the different control devices on the basis of the control program $R_P$. The memory 140 of the control room 103 can further contain a diagnostic program that implements functions A for receiving local diagnostic codes $D_j$ and/or global diagnostic codes $D_{ij}$ and a rule processing. A reporting unit C can further be provided with which a diagnostic result is processed into a desired representation, for example for a workstation computer 105. At least one diagnostic result K can be displayed in a meaningful graphical representation on the workstation computer 105. The diagnostic result K can be supplemented by data elements with which a direct influencing of the process plant 100 can be achieved through an automated processing.

Figure 2:
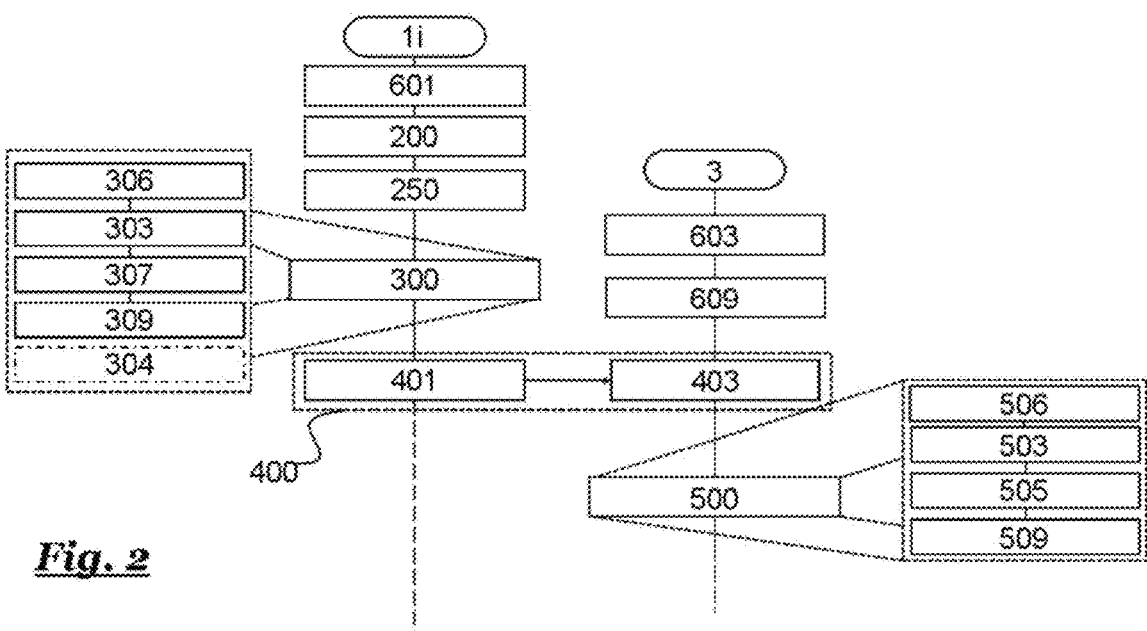
FIG. 2 is a flowchart of a method for diagnosing a control and/or regulation system according to an exemplary embodiment of the present disclosure.

FIG. 2 shows a schematic flowchart of an execution of a method according to the disclosure for diagnosing a control and/or regulation system of a process plant. The flowchart illustrated in FIG. 2 represents a greatly simplified process in which only the method steps carried out by a first control device 1i and a central unit 3 are illustrated. It is evident that the steps illustrated here with regard to an individual example control device 1i only or similar steps can be implemented by the plurality of respective different control devices 1i, 1x, 1y, 1z et cetera of the process plant 100.

The steps carried out by the different units of the system, i.e. by the plurality of different control devices and the central unit 3, can be carried out by independent computing units of the different system components independently of one another, in particular independently of one another temporally, for example simultaneously or successively. It is evident that method steps that are carried out by a plurality of system components in cooperation, namely the communication 400 between a control device 1i and a central unit 3, occur in particular with an in particular temporal coordination of the components involved.

The step 400 of communicating or transmitting at least one diagnostic code $D_{ij}$ from the control device 1i to the central unit 3 comprises sending 401 the diagnostic code $D_{ij}$ by the control device 1i and receiving 403 the diagnostic code $D_{ij}$ by the central unit 3. The transmission step 400 or its sub-steps sending 401 and/or receiving 403 comprise imprinting 404 a control-device-specific identifier $I_i$ on a transmitted local diagnostic code Dj in order to upgrade the diagnostic code to a global diagnostic code $D_{ij}$.

Linking the control-device-specific identifier $I_i$ to the local diagnostic code $D_j$ can be carried out by means of software, for example, by a transformation routine that links a local diagnostic code $D_j$ without an identifier with an identifier $I_i$ for the control device to which the local diagnostic code $D_j$ belongs. Alternatively or additionally, the transformation step can be carried out by means of hardware, for example by the transmission of a local diagnostic code $D_j$ from a particular control device 1i to the central unit 3 via a dedicated signal input of the central unit 3 or a component upstream of the central unit 3 and not illustrated in detail so that the receipt of a local diagnostic code $D_j$ without an control-device-specific identifier at a signal input assigned exclusively to the control device 1i causes a transformation of the local diagnostic code into a global diagnostic code $D_{ij}$.

Before a local diagnostic code $D_j$ is transmitted by the control device 1i to the central unit 3 according to step 400, it must first be provided for sending 401 by the positioner 13.

Through the combination of a local diagnostic code $D_j$ with a control-device-specific identifier $I_i$, the diagnostic codes are upgraded to global diagnostic codes $D_{ij}$, which can be traced back in the process plant 100 to a particular control device 1i. By means of the identifier $I_i$, the central unit 3 is able to place a global diagnostic code $D_{ij}$ in a technical context that can be assigned, for example, to a model of the overall technical process of the process plant 100 or parts of the latter. This makes it possible to deduce a causality between an observed behavior of different control devices 1i. A conclusion regarding the cause of an anomalous behavior of a control device can thus be drawn more readily than exclusively with local data. For example, a reference to a particular control device 1i at which an anomalous behavior is observed can simplify a diagnosis regarding the question of whether the anomalous behavior of the particular control device is caused solely as a result of its specific deviation from a good state or whether a contribution from another control device or another area of the process plant is at least partly responsible.

According to an embodiment of a method according to the disclosure, it can be provided that a local time t is first defined by the control device. In a control device 1i with a control device electronics assembly 13i that uses a microcontroller or the like, this can occur, for example, through the use of a timer or the like of the computing unit 13i. It is noted for the sake of completeness that it is conceivable for a definition of a global time T to be provided to the control device 1i by the central unit 3 or the process control room 103, in particular at regular intervals or at specific times or events, which the control device 1i can use alternatively or in addition to a local time t (not illustrated in detail).

In a capture step 200, the control device 1i captures at least one control-device-specific raw control datum. It is evident that a control device 1i can carry out a plurality of capture steps 200. In the sense of the present method according to the disclosure, capturing 200 can comprise, for example, the reception of a setpoint value w, the reception or measurement of an actual value s, the reception or determination of a setpoint/actual value difference value d and/or the determination of a control value g, in particular by means of a control or regulation routine R.

The control routine R can be implemented in a method step 250 simultaneously with or following the capture step 200. As explained above, the control generally occurs by calculating a control value g based on a setpoint value w as well as, where applicable, an actual value s or based on a prepared setpoint/actual value difference d. The calculation of the control value g can occur, for example, according to a so-called proportional-integral-differential control (PID control).

The control device 1i further carries out a method step according to which a diagnostic code $D_j$, $D_{ij}$ is generated. FIG. 2 illustrates by way of example how a local diagnostic code $D_j$ is generated with the control device 1i in step 300 and its sub-steps. It is evident that generating 300 the diagnostic code can comprise an optional step 304 of transforming the diagnostic code $D_j$ generated by the control device with a control-device-specific identifier $I_i$ so that the control device immediately generates a global diagnostic code $D_{ij}$.

The generation 300 of the diagnostic code can occur by means of a diagnostic routine D. It is evident that the control device 1i can be configured to carry out at least one diagnostic routine D or a plurality of different diagnostic routines for the entire control device or with regard to only parts of the control device or subfunctions of the control device. In the example embodiment illustrated here, the local time t previously defined by the control device is correlated with the diagnostic code $D_j$ for the generation 300 of the local diagnostic code $D_j$. Many digital control devices work in control cycles, wherein a diagnostic routine can be carried out within a control cycle and thus assigned to the latter, wherein a diagnostic routine R can correspond to a sequence of a plurality of control cycles. Through the correlation of the control routine R with one or more control cycles or a local (or global) time t (or T) defined in some other manner, it is possible to correlate the diagnostic code $D_j$ (or $D_{ij}$) generated by the diagnostic routine D with a local time t (or a global time T).

The correlation of a diagnostic code with a local time t can occur, for example, with regard to a time t or a very special periodically recurring time interval $\widetilde{dt}_{il}$ or a time window with an opening time $tF_{ij}$ and an opening duration $dtF_{ij}$.

Based on the correlation with an in particular local time t, the diagnostic routine D can be configured to consider a temporal relation of a plurality of different raw control data relative to one another in a diagnostic step 309. An illustrative example is a diagnostic routine that places a time curve of a setpoint value w or of a control difference d in relation to an actual value s or to a control signal g for a predetermined time or time period, in particular in order to carry out a diagnosis regarding a control response caused in the control device 1i in reaction to a predetermined setpoint signal sequence. A further example of considering 309 a temporal correlation of raw control data can comprise considering at in particular regular intervals an association of particular setpoint signals w (for example a setpoint position) with the control signal g (for example, a control pressure for a pneumatic actuator 15i) generated by the associated control valve 1i in order to check whether the behavior of the control valve 11i changes over time. This makes it possible to detect, for example, signs of wear in the mechanics of the control device or leaks in the pneumatic supply. In many cases, considering 309 the temporal relation of raw control data can be linked with the collection 303 of a piece of information regarding an anomaly, for example in the form of a diagnostic statement.

The control device can establish an anomaly from the raw control data during the execution of a diagnostic routine D in step 300 and imprint one or more particular captured anomalies, for example in the form of a diagnostic statement, on a diagnostic code according to diagnostic routine step 303. It is evident that a diagnostic routine D can alternatively reach the conclusion in the form of a diagnostic result and thus diagnostic code that a behavior is normal and that there is consequently no anomaly. An anomaly generally describes a deviation from a fault-free normal behavior of a control device. For example, an anomaly can occur in the form of a control response to a setpoint w or to a control difference d (for example, the control response can exhibit an overshooting behavior). Alternatively, an anomaly can be detected when the control response to a predetermined setpoint signal w or to a control difference d is slower than expected. The diagnostic routine D can be provided, for example, in the form of a partial stroke test, wherein it can be established whether, for example, there is an undesirable behavior of the mechanics and/or the pneumatics of a control valve 11i.

The diagnostic routine D can comprise a quality determination step 307 in which a quality index Q is calculated based on the raw control data and imprinted on the diagnostic code $D_j$, $D_{ij}$. The quality index Q can characterize the quality of the control operations realized in practice compared to an ideal state. It is evident that the diagnostic routine for generating a single diagnostic code can determine a plurality of quality indexes Q and imprint them on the diagnostic code $D_{ij}$. For example, it is possible for a predetermined number of quality indexes Q to be calculated in step 307. Alternatively or additionally, the calculation of one or more further quality indexes Q can be carried out depending on conditions relating to the previously calculated quality indexes Q. The assignment of one or more calculated quality indexes Q to one or more diagnostic codes $D_j$ can be realized by applying a decision tree saved in a local memory 130 of the control electronics assembly 13i as part of a program or as a set of parameters. Reference is made to Samson TROVIS VIEW and Samson SAM CHEMICALS as examples of diagnostic routines for valve positioners 13. The product names can be protected trademarks.

After the control device 1i has generated one or more diagnostic codes $D_{ij}$ in at least one or a plurality of generation steps 300, the transmission 400 of diagnostic codes $D_{ij}$ described above can be carried out.

The initial definition 609 of at least one global time T is carried out with the central unit 3. A global time T can be implemented in a simple case by means of a clear indication of date and time. Numerous other approaches are conceivable. For example, a global time T can be defined as a system time that depends on a global event pertaining to the process plant 100, for example an initiation event, a maintenance time or the like.

A plurality of different local diagnostic codes of different control devices 1i, 1y, 1x, 1z from the same test period can be aggregated into a data packet by the central unit 3. This data packet can contain further information regarding a time, for example a time interval of the capture of the basic raw process data, in order to allow a temporal classification of the different diagnostic codes relative to the absolute time T or to a synchronized time based on a local time t, which can be used as a common pseudo-global time of the different control devices.

In a step 603, a diagnosis deduction logic γ is defined with the aid of the central unit 3. Defining 603 the diagnosis deduction logic γ comprises the assignment of at least one logical condition BED to at least one preferably global diagnosis code $D_{ij}$ and to at least one action AKT resulting from the presence of the condition BED for the generation of a diagnosis deduction result K. Defining 603 the diagnosis deduction logic γ can comprise respectively determining a plurality of conditions BED in relation to one or more diagnosis codes $D_{ij}$ and actions AKT resulting from the presence of the respective conditions.

The central unit 3 is configured to carry out a determination of a diagnostic result K in a method step 500. In the determination 500, the diagnosis deduction logic γ is applied to the diagnostic codes $D_{ij}$ available to the central unit in order to establish which conditions BED are met and in order to deduce the resulting actions AKT from the latter. The diagnosis deduction result K is constituted by the entirety of the actions AKT to be implemented.

An assignment of the diagnostic codes $D_{ij}$ to a respective diagnostic-code-specific global time T is carried out for the determination 500 of the diagnostic result K. A global time T for a respective diagnostic code $D_{ij}$ can be defined, for example, as at least one time T, a regularly recurring interval $\tilde{T}$ or by means of a time window starting at a particular time $T_{start}$ and lasting for a particular time period dT. The assignment 506 of a global time T to a diagnostic code $D_{ij}$ can be omitted in the determination 500 if a corresponding assignment has already occurred, for example, in the individual control devices 1i.

The determination 500 also comprises forming a set of $\vec{D}_{ij}$ of in particular global diagnostic codes in order to apply the diagnosis deduction logic γ to this set of diagnostic codes. The determination 500 of the diagnostic result K comprises in particular the application 505 of at least one condition BED to the at least one diagnostic code $D_{ij}$ and the implementation 509 of the actions AKT resulting from the latter. For example, an action AKT can state that one or more predetermined diagnosis codes $D_{ij}$ are deleted in the presence of a particular condition BED. This can be expedient, for example, in order to weed out diagnostic codes that have been identified as false positive. Alternatively or additionally, an action AKT can determine that a particular central diagnostic code $D_c$ is generated by the central unit 3 in the presence of a particular condition BED. Such a generation of a central diagnostic code can be expedient, for example, if it is clear from expert knowledge that, in the presence of one or more particular diagnostic codes $D_{ij}$, there is a further or other undesirable state in the process plant 100 to which the central diagnostic code $D_c$ relates.

Another action can bring about the replacement of a diagnostic code $D_{ij}$ with a central diagnostic code $D_c$ in the presence of particular conditions BED, which can be considered a combination of the deletion and the addition described in the foregoing. Such an action can be implemented, for example, as part of the determination of a diagnosis deduction result K when it is clear for an expert based on present diagnosis codes $D_{ij}$ that a state other than the one indicated in the particular global diagnosis code $D_{ij}$ is present, which can be evident from the combination of said particular diagnosis code $D_{ij}$ with one or more other predetermined diagnosis codes $D_{ij}$.

Figure 3:
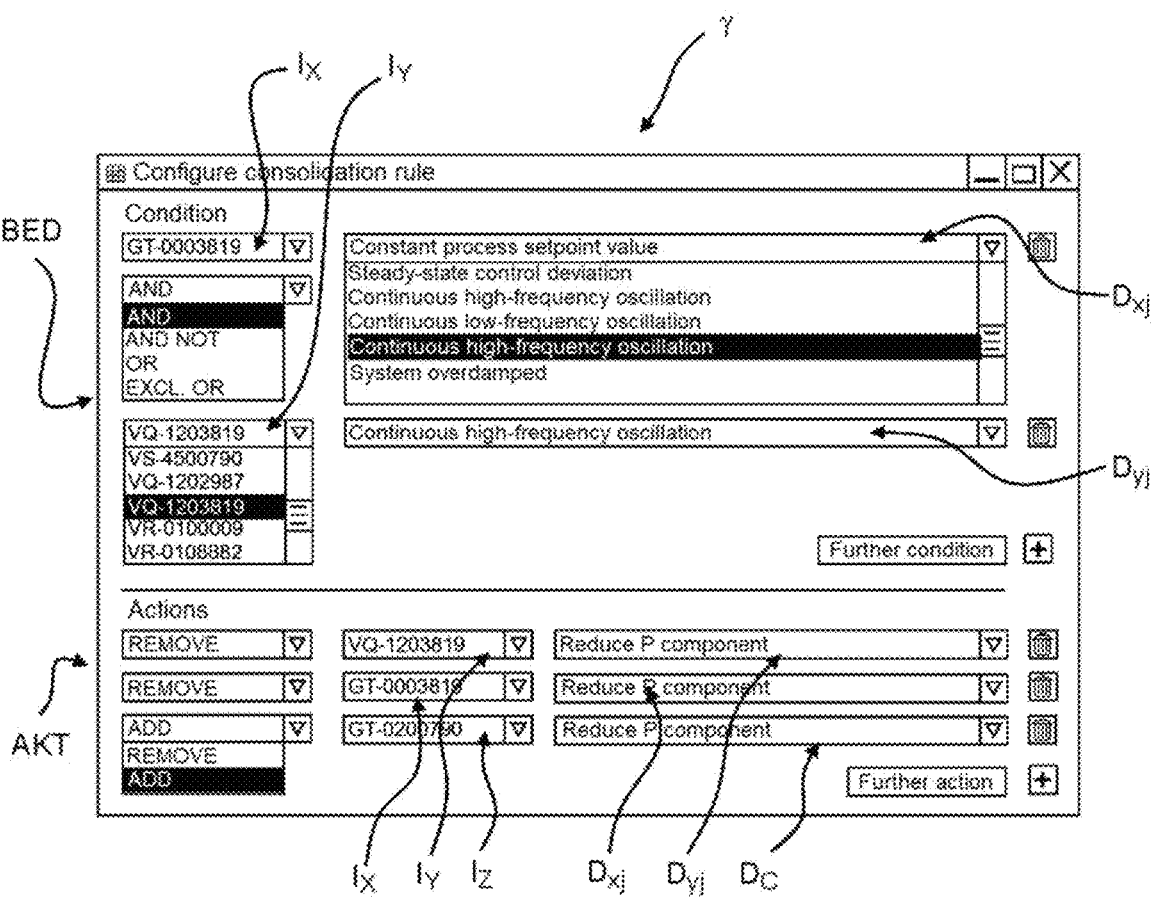
FIG. 3 shows an example input screen of a user interface of a control and/or regulation system according to an exemplary embodiment of the present disclosure.

FIG. 3 shows an example input mask for display on a workstation computer 105. With the input mask according to FIG. 3, new rule descriptions for the conditions BED of the diagnosis deduction logic can be defined or existing rule descriptions of the conditions BED of the diagnosis deduction logic γ can be modified.

According to one example, an expert user can recognize that two temporally closely correlated modifications performed in the configuration of different control devices 1*x*, 1*y* have frequently proven to be incompatible. Based on this knowledge, a rule BED can be generated with which, in the occurrence of global diagnostic codes $D_{yj}$, $D_{xj}$ indicating the incompatible measure in relation to the control devices 1*y*, 1*x*, an action AKT is deduced by means of the diagnosis deduction logic, wherein the action AKT generates a central diagnostic code $D_c$ that comprises a diagnostic statement in the form of a promising measure for eliminating an undesirable system state. Based on this condition BED, the global diagnostic codes $D_{yi}$, $D_{zj}$ indicating the incompatible measures can also be deleted by the control units 1*y*, 1*z*.

According to another case, an expert user can have recognized, following a modification of the configuration of a particular control device 1*z* and in observation of the associated diagnostic code $D_{zj}$, that further modifications were regularly required in the configuration of other control devices 1*y*, 1*x* in order to ensure or restore a failure-free operation. For such a case, the diagnosis deduction logic γ can be defined in such a manner that, based on the diagnostic code $D_{zj}$ relating to the control device 1*z*, an action AKT is generated in the form of both a diagnostic statement for the correction of the anomaly at this control device 1*z* as well as supplementary central diagnostic statements pertaining to the other control devices 1*y*, 1*x*.

According to a third example, oscillating valves can give rise to an air consumption that jeopardizes the compressed air supply in the plant section of these control devices. In such a case, a low supply air pressure can be reported by one or more of the control devices 1*x*, 1*y*, 1*z* in the form of a corresponding diagnostic code. Alternatively or additionally, the control devices 1*x*, 1*y* and/or 1*z* can issue status signals indicating oscillations. A user would occasionally ignore these diagnostic codes indicating oscillations since an oscillating valve is acceptable in some situations. In such a fault constellation, a user of the process plant 100 could incorrectly assume the cause of the drop in air pressure to lie in the air supply to the control devices. In such a risk situation, an expert user can define rules in the diagnostic logic γ so that, in the occurrence of at least one diagnostic code relating to one or more control devices with a common pneumatic supply that indicates a low pneumatic air supply pressure in combination with at least one diagnostic code that indicates an oscillating valve and that generates an action AKT, a central diagnostic code $D_c$ is generated that indicates to the user that a fault cause for the low air supply pressure can be caused by the oscillating valve behavior.

The example input mask illustrated in FIG. 3 can be displayed on a screen terminal on a workstation computer 103. By means of the input mask, the expert user can select rule descriptions comprising conditions BED and associated actions AKT. A condition section is displayed in the top part of the input mask while an action section is illustrated underneath the horizontal line. The expert user can be provided, for example, with selection lists in the form of drop-down menus or the like in order to define the conditions BED in a permitted manner.

In the example shown in FIG. 3, the presence of two particular diagnostic codes is specified as a condition in order to trigger the defined action AKT by the diagnosis deduction logic. First, it is necessary for the predetermined diagnostic code "Continuous high-frequency oscillation: reduce P component" to be issued for the control device designated here by the identifier $I_x$ "GT-003819". At the same time, it is also necessary for an identical diagnostic code to be present for a second control unit with the identifier $I_y$ "VS-1203819" due to the selected logical "AND" connective. In the presence of these conditions BED, the two aforementioned diagnostic codes relevant to these conditions are deleted from the total set $\vec{D}_{ij}$ of diagnostic codes as an action AKT. Moreover, a new central diagnostic code $D_c$ is added, which relates to another control unit with the identifier $I_z$ "GT-0200790".

A temporal relation different from the simultaneity described here can relate, for example, to the occurrence of two particular diagnostic codes within a specified time period, for example "And successively in 2 to 5 seconds".

Different examples of diagnostic codes are listed with their assigned diagnostic statements in the following:

| Diagnostic code | Diagnostic Statement |
|---|---|
| 1. First overshoot larger than a limit value (e.g. 10% of measurement range) | Reduce P component<br>Reduce I Component |
| 2. Number of overshoots up to the detection of the steady state greater than a predetermined limit value | Reduce P component |
| 3. Continuous high-frequency oscillation | Reduce P component<br>Reduce I Component |
| 4. Continuous low-frequency oscillation | Reduce I component<br>Check dead times and reduce them by measurement if necessary |
| 5. Small continuous oscillation of the control difference in terms of absolute values in a quasi-steady state | Configure dead zone for control difference |
| 6. Steady-state control | Connect I component |

-continued

| Diagnostic code | Diagnostic Statement |
|---|---|
| deviation | Configure operating point characteristic curve commanded by setpoint value |
| | Configure setpoint value filter |
| 7. Highly overdamped system | Increase P component Reduce D component |
| 8. Wind-up effect of the I component | Configure anti-wind-up method |

The features disclosed in the foregoing description, figures and claims can be significant both on their own as well as in any combination for the provision of the disclosure in the different variants.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

REFERENCE SIGNS 1i, 1x, 1y Control device
3 Central unit

5 Communication network
11i Control valve
13i Control and/or regulation electronics assembly
15i Actuator
100 Process plant
103 Control room
113 Central computing unit
130, 140 Memory
131, 141 Processor
134, 144 Network connection
200 Capturing
250 Actuating
300 Generating
303 Anomaly description
304, 404 Transforming
306 Correlating with local time
307 Quality determination
309 considering a temporal relation
400 Transmitting
401 Sending
403 Receiving
500 Determining
503 Forming modified quantity
505 Applying condition
506 Correlating with global time
509 Carrying out action
601 Defining local time
603 Defining diagnosis deduction logic
609 Defining global time
AKT Action
BED Condition
d Setpoint/actual value difference value
D Diagnostic routine
$D_c$ Central diagnostic code
$D_P$ Control circuit diagnostic routine
$D_j$ Local diagnostic code
$D_{ij}$, $D_{xj}$, $D_{yj}$ Global diagnostic code
$\vec{D}_{ij}$ Set of diagnostic codes
$(\vec{D}^*_{ij})$ Modified quantity
g Control signal
$I_i$, $I_x$, $I_y$, $I_z$ Control-device-specific identifier
K Deduction result
Q Quality index
R Control routine
$R_P$ Process control routine
RBD Rule database
s Actual value signal
$t_i$ Local time
$tF_{ij}$ Local time window
$dtF_{ij}$ Local opening duration
$\widetilde{dt}_{il}$ Local time interval
T Global time
$T_{start}$ Start time
$T_{end}$ End time
w Setpoint signal
γ diagnosis deduction logic

The invention claimed is:

1. A method for diagnosing a control and/or regulation system of a process plant having a central unit and a plurality of control devices configured to adjust a process fluid, the method comprising:

capturing, by a control device of the plurality of control devices, at least one control-device-specific raw control datum;

actuating, by the control device and based on the at least one captured raw control datum and according to a control and/or regulation routine, a respective control valve to adjust a process fluid flow of the process plant:

generating, by the control device and based on the at least one captured raw control datum, at least one local diagnostic code;

transmitting the at least one diagnostic code from the respective-control device to the central unit;

transforming a local diagnostic code originating from and/or relating to a particular control device into a global diagnostic code by linking the local diagnostic code with a control-device-specific identifier;

defining at least one logical condition for a diagnosis deduction logic; and determining at least one deduction result, by the diagnosis deduction logic, based on the at least one diagnostic code and the at least one logical condition.

2. The method according to claim 1, wherein at least one diagnostic code is correlated with a global time.

3. The method according to claim 2, wherein determining at least one deduction result comprises assigning, by the diagnosis deduction logic, a deduction result to a set of global diagnostic codes, the diagnosis deduction logic considering at least one temporal condition in relation to the global time.

4. The method according to claim 3, wherein the determining a deduction result comprises assigning, by the diagnosis deduction logic, a deduction result to a set of global diagnostic codes, the diagnosis deduction logic considering at least one temporal condition, regarding a temporal simultaneity, sequence, or time series, of at least two predetermined global diagnostic codes in relation to the global time.

5. The method according to claim 1, wherein the at least one local diagnostic code generated by a control device is correlated with a control-device-specific local time.

6. The method according to claim 5, wherein the local time is defined as a time window with an opening time determined based on a predetermined process signal event or a predetermined signal sequence of an actual value signal.

7. The method according to claim 5, wherein the local time is defined as a periodically recurring time interval, a constant control variable being provided by a control and/or regulation electronics assembly of the control device to an actuator of the control device during the periodically recurring time interval, wherein the control variable is calculated based on a setpoint value, an actual value, a control deviation defined by the difference between the actual value and the setpoint value, and a control routine considering the control deviation.

8. The method according to claim 1, wherein determining at least one deduction result comprises considering, by the central unit, a set of global diagnostic codes to form a deduction result from a modified quantity of the global diagnostic codes, wherein the modified quantity corresponds to the set absent at least one global diagnostic code and/or with at least one additional central diagnostic code.

9. The method according to claim 8, wherein the deduction logic is provided with a logical condition configured to: detect, in a predetermined constellation of global diagnostic codes, that a diagnosis result is a false positive, and delete the global diagnostic code identified as the false positive.

10. The method according to claim 1, wherein the determining at least one consolidation result comprises: considering at least one first global diagnostic code of a first control device and at least one second global diagnostic code of a second control device during the determination.

11. The method according to claim 1, wherein the central unit applies the one or more logical conditions to a plurality of diagnostic codes to determine the at least one deduction result.

12. The method according to claim 1, wherein determining at least one deduction result comprises considering, by the central unit, a set of global diagnostic codes to form the deduction result from a modified quantity of the global diagnostic codes, wherein the modified quantity corresponds to the set of global diagnostic plus at least one central diagnostic code.

13. The method according to claim 1, wherein:

generating the at least one local diagnostic code comprises generating the at least one local diagnostic code such that the at least one diagnostic code relates to an anomaly based on the at least one raw control datum;

the method further comprises determining anomaly information regarding the anomaly based on raw control data; and the generating of the at least one diagnostic code further comprises imprinting a diagnostic statement on the diagnostic code, the diagnostic statement including an anomaly type, a cause of the anomaly, and/or a diagnostic and corrective measure to address the anomaly.

14. The method according to claim 1, further comprising calculating at least one quality index based on raw control data, wherein generating the at least one diagnostic code includes imprinting the at least one quality index corresponding to a quality of the control routine on the diagnostic code.

15. The method according to claim 1, wherein the global diagnostic code is formed by:

the control device during generating or sending the local diagnostic code, a communication device during transmitting of the local diagnostic code, or the central unit during the receiving a local diagnostic code or during determining the at least one deduction result.

16. The method according to claim 1, wherein generating the at least one diagnostic code is based on a temporal relation of at least two items of raw control data.

17. The method according to claim 1, wherein the generation of at least one diagnostic code and the determination of a deduction result considering at least one diagnostic code of at least one other control device is performed by a computer of an individual control device.

18. The method according to claim 1, wherein determining the at least one deduction result comprises forming a modified quantity of global diagnostic codes, from a set of global diagnostic codes, based on an action of the at least one deduction result.

19. A control and/or regulation system for a process plant, comprising:

a plurality of control devices, each control device including a control valve configured to adjust a process fluid flow of the process plant, and a computer configured to: actuate the control valve, based on at least one raw control datum according to a control and/or regulation routine, to adjust the process fluid flow of the process plant, and generate diagnostic codes relating to an anomaly based on the at least one raw control datum according to the diagnostic routine;

a central unit configured to: obtain at least one logical condition for application to at least one diagnostic code as a diagnosis deduction logic, and determine a deduction result according to the diagnosis deduction logic based on diagnostic codes provided by the control devices; and a communication device configured to transmit the at least one diagnostic code from the control devices to the central unit.

20. The control and/or regulation system according to claim 19, wherein the central unit is integrated in one of the control devices.

21. The control and/or regulation system according to one of claim 19, wherein the central unit is implemented separately from the control devices.

\* \* \* \* \*